US010224056B1

(12) United States Patent
Torok et al.

(10) Patent No.: US 10,224,056 B1
(45) Date of Patent: Mar. 5, 2019

(54) CONTINGENT DEVICE ACTIONS DURING LOSS OF NETWORK CONNECTIVITY

(71) Applicant: Rawles LLC, Wilmington, DE (US)

(72) Inventors: Fred Torok, Seattle, WA (US); Rohan Mutagi, Redmond, WA (US); Vikram Kumar Gundeti, Seattle, WA (US); Frederic Johan Georges Deramat, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 559 days.

(21) Appl. No.: 14/109,319

(22) Filed: Dec. 17, 2013

(51) Int. Cl.
*G10L 21/06* (2013.01)

(52) U.S. Cl.
CPC .................................. *G10L 21/06* (2013.01)

(58) Field of Classification Search
CPC .......... H04M 1/72533; H04M 2250/74; H04L 67/18; H04L 67/025; H04L 67/325; H04L 67/125; H04W 4/001; H04W 4/02; H04W 4/025; H04W 4/046; G10L 15/1822; G10L 15/22; G10L 15/26; G10L 15/265; G10L 15/30
USPC ..... 704/200–231, 246, 251–255, 270–270.1, 704/273–275, E17.001–E17.016, 704/E15.001–E15.05, E11.001–E11.007
See application file for complete search history.

(56) References Cited

U.S. PATENT DOCUMENTS

| | | | | |
|---|---|---|---|---|
| 5,661,787 A | * | 8/1997 | Pocock | H04N 21/63 379/101.01 |
| 6,144,938 A | * | 11/2000 | Surace | G10L 13/033 704/257 |
| 6,192,340 B1 | * | 2/2001 | Abecassis | G10H 1/0058 455/185.1 |
| 7,418,392 B1 | * | 8/2008 | Mozer | G10L 15/26 315/307 |
| 7,522,711 B1 | * | 4/2009 | Stein | G01C 21/3608 379/88.04 |
| 7,526,566 B2 | * | 4/2009 | Ang | H04L 29/06027 379/908 |
| 7,720,683 B1 | * | 5/2010 | Vermeulen | G10L 15/22 704/235 |

(Continued)

FOREIGN PATENT DOCUMENTS

WO WO2011088053 A2 7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — Matthew H Baker
(74) *Attorney, Agent, or Firm* — Lee & Hayes, P.C.

(57) ABSTRACT

A speech-based system includes a local device in a user premises and a network-based control service that directs the local device to perform actions for a user. The control service may specify a first action that is to be performed upon detection by the local device of a stimulus. In some cases, performing the first action may rely on the availability of network communications with the control service or with another service. In these cases, the control service also specifies a second, fallback action that does not rely upon network communications. Upon detecting the stimulus, the local device performs the first action if network communications are available. If network communications are not available, the local device performs the second, fallback action.

20 Claims, 3 Drawing Sheets

(56) References Cited

U.S. PATENT DOCUMENTS

| | | | |
|---|---|---|---|
| 7,774,204 B2 | 8/2010 | Mozer et al. | |
| 8,036,068 B1* | 10/2011 | Yamagami | G04G 13/028 368/244 |
| 8,521,766 B1* | 8/2013 | Hoarty | G06F 17/30023 704/251 |
| 8,582,737 B2* | 11/2013 | Lawson | H04M 15/41 379/114.02 |
| 8,874,436 B2* | 10/2014 | Goldhor | H04N 5/76 386/200 |
| 9,443,536 B2* | 9/2016 | Cho | G06K 9/00335 |
| 2001/0032081 A1* | 10/2001 | Unger | H04M 3/493 704/270.1 |
| 2002/0016827 A1* | 2/2002 | McCabe | G06F 11/2058 709/213 |
| 2002/0129057 A1* | 9/2002 | Spielberg | G06F 3/165 715/201 |
| 2003/0038840 A1* | 2/2003 | Stern | G06F 17/30899 715/760 |
| 2003/0110248 A1* | 6/2003 | Ritche | H04L 41/0613 709/224 |
| 2003/0140121 A1* | 7/2003 | Adams | G06F 17/30902 709/219 |
| 2003/0163484 A1* | 8/2003 | Salmonsen | H04L 12/56 |
| 2004/0028195 A1* | 2/2004 | Leyden | H04M 1/72522 379/88.17 |
| 2004/0044516 A1* | 3/2004 | Kennewick | G10L 15/22 704/5 |
| 2004/0073831 A1* | 4/2004 | Yanai | G06F 3/0601 714/6.32 |
| 2004/0102962 A1* | 5/2004 | Wei | G06Q 10/109 704/201 |
| 2004/0220926 A1* | 11/2004 | Lamkin | G06F 17/30017 |
| 2005/0159833 A1* | 7/2005 | Giaimo | A63F 13/12 700/94 |
| 2005/0160318 A1* | 7/2005 | Di Luoffo | G06F 11/0709 714/25 |
| 2005/0187902 A1* | 8/2005 | Carpentier | H04L 67/108 |
| 2005/0260974 A1* | 11/2005 | Lee | H04M 11/10 455/412.2 |
| 2006/0008256 A1* | 1/2006 | Khedouri | G06F 17/30038 386/234 |
| 2006/0022048 A1* | 2/2006 | Johnson | H04L 69/329 235/462.1 |
| 2006/0031216 A1* | 2/2006 | Semple | G06F 17/30858 |
| 2006/0143236 A1* | 6/2006 | Wu | G06F 17/30053 |
| 2007/0033005 A1* | 2/2007 | Cristo | G06F 17/279 704/9 |
| 2007/0033155 A1* | 2/2007 | Landsman | G06F 17/30899 |
| 2007/0047719 A1* | 3/2007 | Dhawan | H04M 1/2478 379/235 |
| 2007/0089132 A1* | 4/2007 | Qureshey | G06F 17/30749 725/39 |
| 2007/0106941 A1* | 5/2007 | Chen | H04N 7/17318 715/728 |
| 2007/0156726 A1* | 7/2007 | Levy | G06F 17/3002 |
| 2007/0220010 A1* | 9/2007 | Ertugrul | G06Q 30/02 |
| 2008/0046471 A1* | 2/2008 | Moore | G06Q 10/109 340/10 |
| 2008/0072132 A1* | 3/2008 | Moraveji | G06F 17/30056 715/203 |
| 2008/0104106 A1* | 5/2008 | Rosenberg | G06F 17/30752 |
| 2008/0151696 A1* | 6/2008 | Giroud | G04G 13/026 368/10 |
| 2008/0229199 A1* | 9/2008 | Richardson | G06F 17/30943 715/714 |
| 2008/0243788 A1* | 10/2008 | Reztlaff | G06F 17/30657 |
| 2008/0256315 A1* | 10/2008 | Awai | G06F 11/1448 711/162 |
| 2008/0294434 A1* | 11/2008 | Pettinato | G06F 9/542 704/235 |
| 2009/0006418 A1* | 1/2009 | O'Malley | G06F 17/30902 |
| 2009/0044055 A1* | 2/2009 | Wang | G06F 9/4446 714/27 |
| 2009/0055189 A1* | 2/2009 | Stuart | H04H 20/106 704/270 |
| 2009/0125308 A1* | 5/2009 | Ambler | G10L 15/26 704/254 |
| 2009/0158099 A1* | 6/2009 | Cui | G06F 11/0748 714/57 |
| 2009/0177736 A1* | 7/2009 | Christensen | G06Q 30/02 709/203 |
| 2009/0228379 A1* | 9/2009 | Honts | G06Q 30/02 705/30 |
| 2010/0169493 A1* | 7/2010 | Yamakawa | H04L 65/1083 709/227 |
| 2010/0269042 A1* | 10/2010 | Richards | G06F 3/038 715/716 |
| 2010/0281178 A1* | 11/2010 | Sullivan | H04N 7/24 709/231 |
| 2010/0299144 A1* | 11/2010 | Barzelay | G10H 1/0008 704/233 |
| 2011/0055270 A1* | 3/2011 | Firminger | G06Q 10/109 707/780 |
| 2011/0078172 A1* | 3/2011 | LaJoie | G06F 17/30775 707/769 |
| 2011/0138219 A1* | 6/2011 | Walton | G06F 11/0712 714/3 |
| 2011/0252319 A1* | 10/2011 | Garcia, Jr. | H04L 12/1827 715/702 |
| 2012/0023520 A1* | 1/2012 | Lordan | G06F 17/30029 725/32 |
| 2012/0051561 A1* | 3/2012 | Cohen | G10L 21/00 381/122 |
| 2012/0210233 A1* | 8/2012 | Davis | G06Q 30/0201 715/727 |
| 2012/0223885 A1* | 9/2012 | Perez | G06F 3/011 345/158 |
| 2012/0232910 A1* | 9/2012 | Dressler | H04S 3/02 704/500 |
| 2012/0240045 A1* | 9/2012 | Bradley | G10L 13/04 715/716 |
| 2012/0278312 A1* | 11/2012 | McCoskey | H04N 7/17318 707/722 |
| 2013/0205063 A1* | 8/2013 | Zhang | G06F 11/1415 711/102 |
| 2013/0332782 A1* | 12/2013 | Christena | G06F 11/32 714/57 |
| 2014/0081988 A1* | 3/2014 | Woods | G06F 17/30 707/748 |
| 2014/0143231 A1* | 5/2014 | Adari | G06F 17/30899 707/722 |
| 2014/0173350 A1* | 6/2014 | Roy | G06F 11/006 714/37 |
| 2014/0203940 A1* | 7/2014 | Bonner | G08B 21/24 340/601 |
| 2015/0170665 A1* | 6/2015 | Gundeti | G06F 3/165 704/270.1 |
| 2016/0151603 A1* | 6/2016 | Shouldice | H04R 3/00 600/28 |
| 2017/0358300 A1* | 12/2017 | Laurens | G10L 15/1822 |

* cited by examiner

CONTINGENT DEVICE ACTIONS DURING LOSS OF NETWORK CONNECTIVITY

BACKGROUND

Homes, offices, automobiles, and public spaces are becoming more wired and connected with the proliferation of devices that rely on network-based services for some or all of their functionality. For example, home media devices often obtain video and/or audio content from online, network-based sources rather than relying on local storage of such content. One disadvantage of these devices, however, is that they may cease to function during periods of network unavailability or network-based control service outages.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure pertains generally to a device and system that interact with users through speech to provide functions and services. A local device may be controlled by a remote, network-based control service, which may be configured to interact with a user by generating speech messages to the user and responding to user speech. The control service may use the local device to monitor user speech in order to detect voice commands and to determine actions desired by the user. The actions may be implemented in whole or in part by the local device in response to instructions or commands from the control service.

In some cases, the control service may specify a stimulus and a corresponding action, and the local device may be configured to monitor for the stimulus and to perform the corresponding action in response to the stimulus. For example, the control service may instruct the local device to implement a time-based notification or alarm by specifying a recurring time of day and a corresponding action that is to be performed at the specified time of day. The action may sometimes comprise a network-dependent activity such as obtaining and playing music from an online source.

In addition to specifying the network-dependent action, the control service may specify a reduced-functionality, network-independent action to be performed by the local device in situations where the control service and/or network communications are temporarily unavailable. For example, the control service may specify a generic speech message or a short audio segment that can be stored by the local device and played in response to the stimulus in the case that there is no network connectivity at the time of the stimulus. As another example, the control service may instruct the local device to use previously cached information when performing an action.

More generally, the system may be configured to specify a contingent action in terms of a stimulus, a network-dependent function, and a corresponding network-independent function that can be performed without network access. The local device is configured to detect occurrences of the stimulus and in response (a) perform the network-dependent function if network communications are available or (b) perform the network-independent function if network communications are not available.

Figure 1:
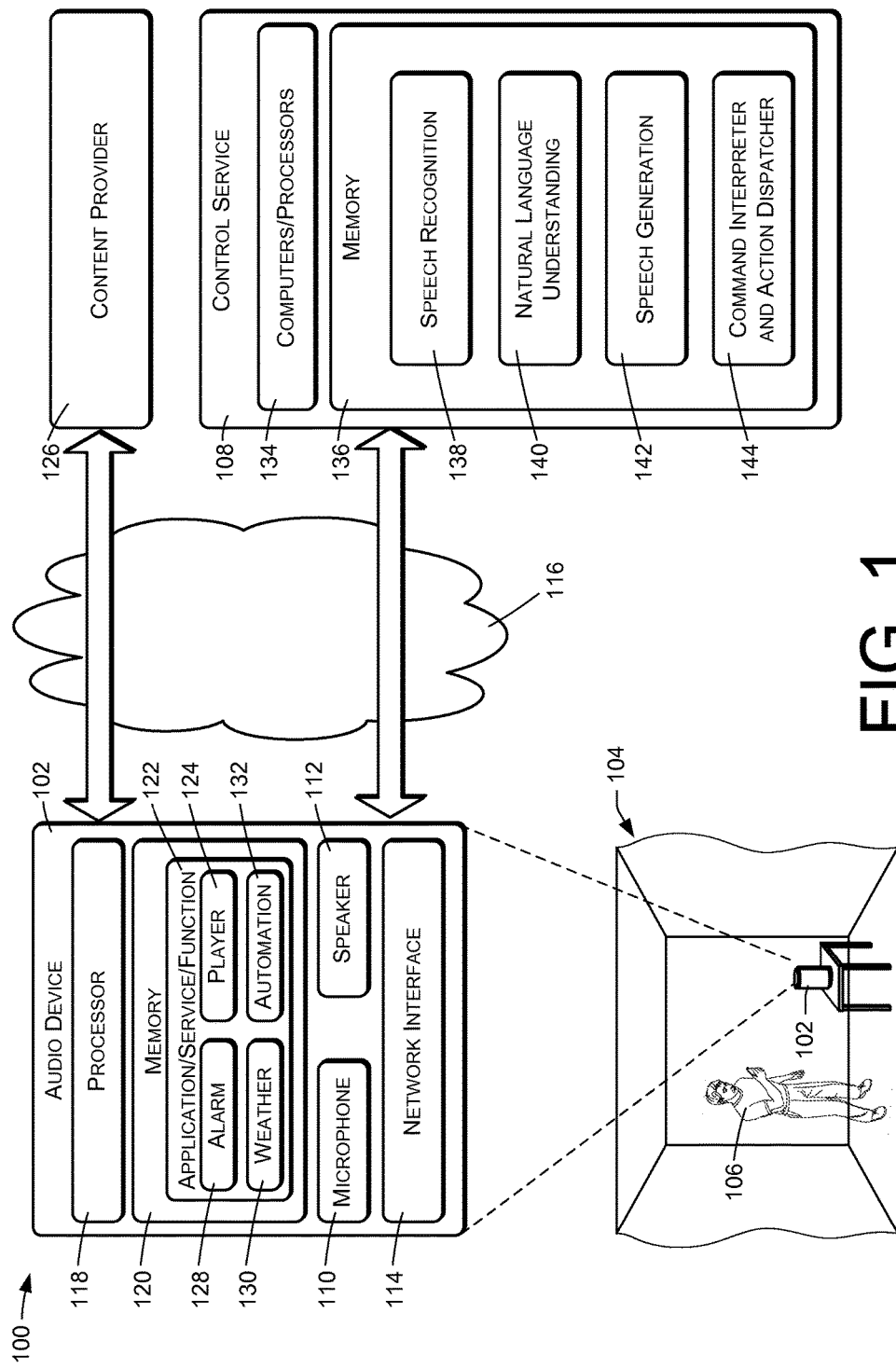
FIG. 1 is a block diagram of an illustrative voice interaction computing architecture that includes a local audio device and a remote control service.

FIG. 1 shows an example of a voice interaction computing system 100. The system 100 may include or may utilize a local voice-based audio device 102 that is capable of playing various types of audio. The voice-based audio device 102 may be local to and/or located within an environment 104 such as a home to provide services for a user 106 within the environment 104. The local voice-based audio device 102 may operate in conjunction with and/or under the control of a remote, network-based or network-accessible control service 108 that is configured to receive audio from the audio device 102, to recognize speech in the audio, and to perform functions or services in response to the recognized speech. Such functions or services may be implemented by the control service 108 independently of the audio device 102, and/or may be implemented by providing a command to the audio device 102 for local execution by the audio device 102. For example, the control service 108 may instruct the audio device 102 to play music, speech, or other audio content specified by the control service 108.

The audio device 102 may have one or more microphones 110 and one or more audio speakers or transducers 112 to facilitate audio interactions with the user 106. The audio device 102 may have a network communications interface 114 for communications over a communications network 116 with the control service 108. The communications network 116 may comprise a public, wide-area network such as the Internet or may comprise any of various other types of public and private networks that extend beyond the local premises of the user 106. Additionally, the communications interface 114 may communicate locally over a local-area network within the user premises.

In certain embodiments, the primary mode of user interaction with the audio device 102 and control service 108 is through speech. For example, the audio device 102 may receive spoken command expressions from the user 106 and may provide services in response to the commands. The user may speak a predefined wake or trigger expression (e.g., "Awake"), which may be followed by commands or instructions (e.g., "I'd like to go to a movie. Please tell me what's playing at the local cinema."). Provided services may include performing actions or activities, rendering media, obtaining and/or providing information, providing information via generated or synthesized speech via the audio device 102, initiating Internet-based services on behalf of the user 106, and so forth.

The audio device 102 includes operational or control logic, which in many cases may comprise a processor 118 and memory 120. The processor 118 may include multiple processors and/or a processor having multiple cores. The processor 118 may also comprise or include a digital signal processor for processing audio signals.

The memory 120 may contain applications and programs in the form of computer-executable instructions that are executed by the processor 118 to perform acts or actions that implement desired functionality of the audio device 102, including the functionality that is specifically described below. The memory 120 may be a type of non-transitory computer-readable storage media and may include volatile and nonvolatile memory. Thus, the memory 120 may include, but is not limited to, RAM, ROM, EEPROM, flash memory, or other memory technology.

The audio device 102 may include a plurality of applications, services, and/or functions 122, referred to collectively below as functional components 122, which reside in the memory 120 and are executable by the processor 118 to provide services and functionality. The applications and other functional components 122 may include a media playback component 124 such as a media player that obtains music and/or other content from a network-based content provider 126 and plays the content on the speaker 112 of the audio device 102. Generally, such content may comprise audio and/or visual content, including music, video, text, speech, documents, pictures, instructions, information, data, and so forth.

The functional components 122 may include an alarm application 128 that the user 106 may set by voice commands to provide an alert or notification at a specified time or after an elapsed time. The alarm application 128 may work in conjunction with the playback component 124 to initiate playing of music or other content to provide notification to the user 106 at the designated time.

The functional components 122 may, as another example, include a weather application 130 that connects to a content provider to provide weather in response to a user request. The functional components 122 may further include an automation application 132 that monitors and controls home automation equipment within the environment 104. The automation application 132 may be configured to communicate events within the user environment 104 through different communications media such as email, text messages, voice messages, etc.

The illustrated functional components 122 are examples of possible functions that may be provided by the audio device 102. Generally, the audio device 102 may be configured by way of applications or other logic to provide services that may include such things as requesting and consuming entertainment (e.g., gaming, finding and playing music, movies or other content, etc.), personal management (e.g., calendaring, note taking, etc.), online shopping, financial transactions, database inquiries, person-to-person voice communications, and so forth.

In some embodiments, the functional components 122 may be pre-installed on the audio device 102, and may implement core functionality of the audio device 102. In other embodiments, one or more of the applications or other functional components 122 may be installed by the user 106 or otherwise installed after the audio device 102 has been initialized by the user 106, and may implement additional or customized functionality as desired by the user 106.

Although the audio device 102 is described herein as a voice-controlled or speech-based interface device, the techniques described herein may be implemented in conjunction with various different types of devices, such as telecommunications devices and components, hands-free devices, entertainment devices, media playback devices, and so forth.

The control service 108 may in some instances be part of a network-accessible computing platform that is maintained and accessible via the network 116. Network-accessible computing platforms such as this may be referred to using terms such as "on-demand computing", "software as a service (SaaS)", "platform computing", "network-accessible platform", "cloud services", "data centers", and so forth. The control service 108 may be configured to provide services to large numbers of audio devices 102 in the homes or premises of different users.

The audio device 102 and/or the control service 108 may communicatively couple to the network 116 via wired technologies (e.g., wires, universal serial bus (USB), fiber optic cable, etc.), wireless technologies (e.g., radio frequencies (RF), cellular, mobile telephone networks, satellite, Bluetooth, etc.), or other connection technologies. The network 116 is representative of any type of communication network, including data and/or voice network, and may be implemented using wired infrastructure (e.g., coaxial cable, fiber optic cable, etc.), a wireless infrastructure (e.g., RF, cellular, microwave, satellite, Bluetooth®, etc.), and/or other connection technologies.

The control service 108 generally provides functionality for receiving an audio stream from the audio device 102, recognizing speech in the audio stream, determining user intent from the recognized speech, and performing an action or service in response to the user intent. The provided action may in some cases be performed in conjunction with the audio device 102 and in these cases the control service 108 may return a response to the audio device 102 indicating a command that is to be executed by the audio device 102 or a function that is to be performed by the audio device 102.

In some embodiments, the speech command service 108 may provide much of the functionality that is described above as being provided by the functional components 122. For example, music playback may be under the control of the speech command service 108 rather than being locally controlled. Thus, the speech command service 108 may receive a command relating to music playback, and may respond by commanding the audio device 102 to play certain music or to perform another operation with regard to music that is already playing. Because of the control and supervision of the speech command service 108, the audio device 102 may in certain situations provide only low-level services and functions, while the speech command service is responsible for higher-level operational logic and functionality.

The control service 108 includes operational or control logic, which in many cases may comprise one or more servers, computers, and or processors 134. The control service 108 may also have memory 136 containing applications and programs in the form of instructions that are executed by the processor 134 to perform acts or actions that implement desired functionality of the control service, including the functionality specifically described herein. The memory 136 may be a type of computer storage media and may include volatile and nonvolatile memory. Thus, the memory 136 may include, but is not limited to, RAM, ROM, EEPROM, flash memory, or other memory technology. In certain implementations, the control service 108 may comprise a plurality of servers configured to communicate with multiple audio devices 102 over the Internet.

Among other logical and physical components not specifically shown, the control service 108 may comprise speech recognition components 138. The speech recognition components 138 may include automatic speech recognition (ASR) functionality that recognizes human speech in an audio signal provided by the audio device 102 from the microphone 110.

The control service 108 may also comprise a natural language understanding component (NLU) 140 that determines user intent based on user speech that is recognized by the speech recognition components 138.

The control service 108 may further comprise a speech generation component 142 that synthesizes or otherwise produces speech audio. For example, the speech generation component 142 may comprise a text-to-speech component that produces speech from text to produce text messages to be played on the speaker 112 of the audio device 102.

The control service 108 may also comprise a command interpreter and action dispatcher 144 (referred to below simply as a command interpreter 144) that determines functions or commands corresponding to user intents. In some cases, commands may correspond to functions that are to be performed at least in part by the audio device 102, and the command interpreter 144 may in those cases provide device commands to the audio device 102 for implementing such functions. Examples of functions or actions that may be performed by the audio device in response to directives from the command interpreter 144 include playing music or other media, setting alarms or notifications, increasing/decreasing the volume of the speaker 112, generating audible speech through the speaker 112, initiating certain types of communications with users of similar devices, performing actions relating to home automation, obtaining and playing or presenting content, and so forth.

Note that the control service 108 may also perform functions, in response to speech recognized from received audio, that involve entities or devices that are not shown in FIG. 1. For example, the control service 108 may interact with other network-based services to obtain information or services on behalf of the user 106. Furthermore, the control service 108 may itself have various elements and functionality that may be responsive to speech uttered by the user 106.

In some situations, commands provided by the control service 108 may specify actions that are to be performed by the audio device 102 in the future, in response to a specified stimulus. In these situations, a command provided by the control service 108 to the audio device 102 may specify a stimulus and an accompanying action. In some cases, the action may be a network-dependent action and may therefore rely on network connectivity and communications between the audio device 102 and a remote, network-accessible service such as the control service 108 or the content provider 126.

As an example, the audio device 102 may be instructed to notify the user 106 whenever a visitor rings the doorbell of the user's residence. The notification may take the form of an email, where sending the email involves communicating with a remote provider such as an email service. Alternatively, the audio device may be configured to notify the control service 108 and the control service 108 may send the email.

As another example, the audio device may be instructed to play music from the online content provider 126 at a certain time or time of day. Obtaining the music may involve communicating with the content provider 126 over the wide-area network 116.

In order to provide at least minimal local functionality when wide-area network communications are not available to the audio device 102, a command from the control service 108 may specify a fallback, contingent, or network-independent action along with any preferred, network-dependent action. When network communications with remote entities and sources are available, the audio device 102 performs the network-dependent action in response to the stimulus specified by the control service 108. Otherwise, when wide-area network communications are not available, the audio device 102 performs the network-independent action. The network-dependent action may correspond to a full intended functionality, while the network-independent function may correspond to degraded or reduced functionality. Thus, in many embodiments, the network-independent action may comprise a reduced functionality version of a corresponding network-dependent action.

In the examples above, the email and music actions constitute examples network-dependent actions since they involve network communications with remote providers or services. As a fallback alternative to email, a network-independent function may comprise sounding an audible alert within the user premises, which may be possible without communicating outside the premises. As a fallback alternative to rendering music, a network-independent function may comprise playing a short preconfigured tune or tone within the environment 104, such as from the speaker 112 of the audio device 102. These are but two examples of alternative, network-independent actions that may be performed by the audio device 102 without wide-area network connectivity and without support from the control service 108, content provider 126, or other remote entity.

Figure 2:
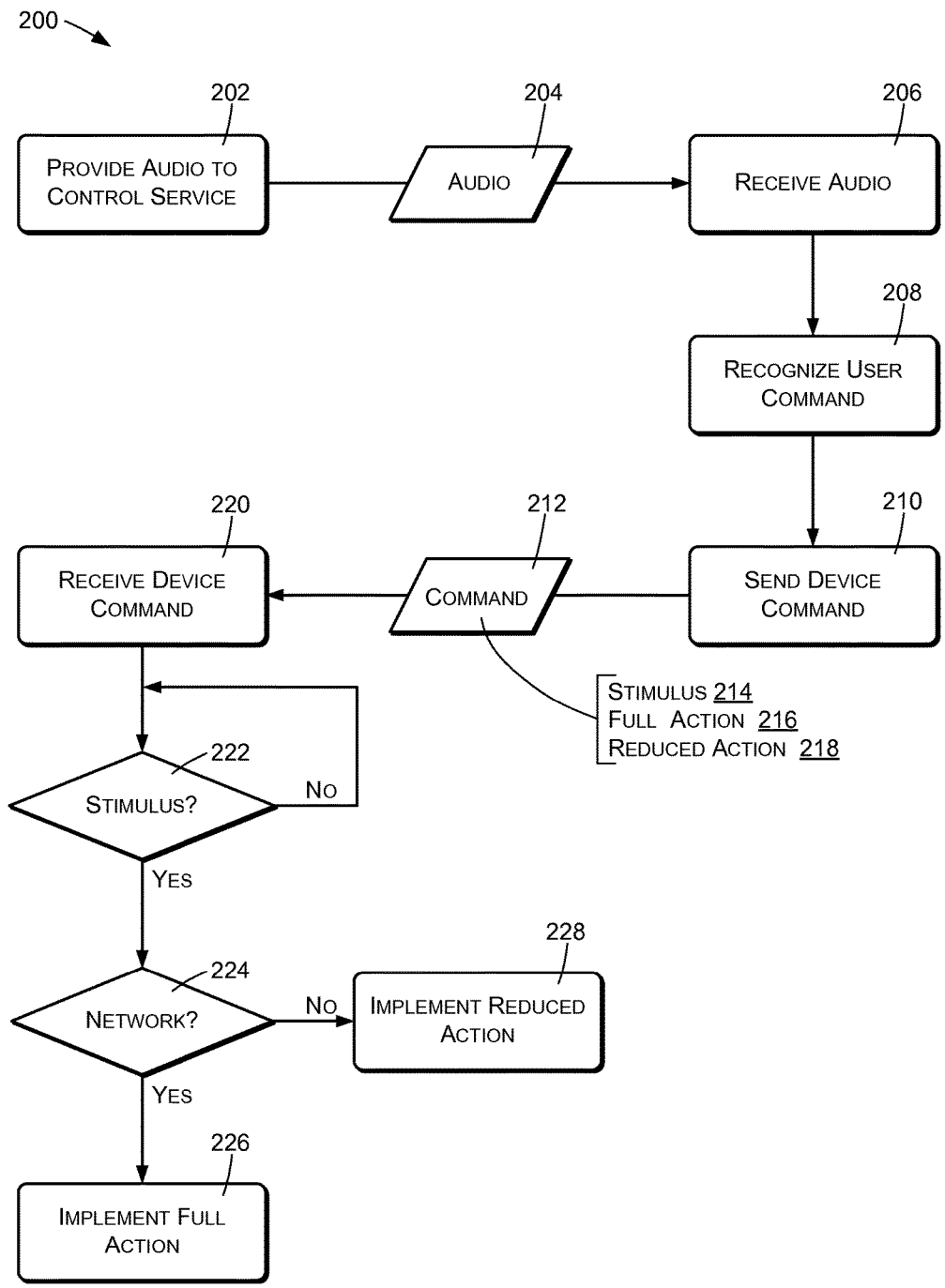
FIG. 2 is a flow diagram illustrating an example of information flow between the local audio device and the remote control service.

FIG. 2 illustrates an example method 200 involving operations and interactions between the audio device 102 and the control service 108. An action 202, performed by the audio device 102, may comprise providing user audio 204 from the microphone 110 to the control service 108 for recognition of speech in the audio 204. The audio 204 may in the form of a digital audio stream. In the described embodiment, the audio 204 is captured using the microphone 110 of the audio device 102, digitized, and transmitted or streamed over the communications network 116 to the control service 108.

An action 206, performed by the control service 108, comprises receiving the audio 204. An action 208 performed by the control service 108 comprises analyzing the received audio 204 to detect and recognize a spoken user command in the audio 204. This may be performed by the speech recognition component 138 and natural language understanding component 140 of the control service 108.

An action 210, performed by the control service 108, comprises formulating and sending a device command 212 to the audio device 102. The command may specify a stimulus 214, a full network-dependent action 216, and a reduced network-independent action 218. The full network-dependent action is to be performed by the audio device 102 in response to the specified stimulus 214 when wide-area network communications are available. The reduced or network-independent action is to be performed by the audio device 102 in response to the specified stimulus when wide-area network communications are not available.

As a specific example, the stimulus 214 may comprise a time or time of day. The full action 216 may be specified by identifying a media source from which music or other audio content is available for streaming. For example, the full action 216 may be specified by a URL (uniform resource locator) corresponding to particular content available to the audio device 102 from a remote or network-based content source such as the content provider 126 of FIG. 1. The reduced action 218 may be specified by identifying media such as music or other audio content that will be available to the audio device 102 locally even when wide-area network communications are not available to the audio device 102. For example, a short audio segment may be embedded in the command 212 or otherwise provided by the control service 108 in conjunction with the command 212. Alternatively, the command 212 may identify or specify audio that is already stored by the audio device 102.

An action 220, performed by the audio device 102, comprises receiving the device command 212 from the control service 108. As discussed above, the device command 212 may contain or specify the stimulus 214, the full action 216 that is to be preferably demonstrated by the audio device 102 in response to the stimulus 214, and the alternate, degraded or reduced action 218 that is to be performed in response to the stimulus 214 as a fallback when wide-area network communications are not available to the audio device 102.

Remaining actions shown in FIG. 2 are also performed by the audio device 102. An action 222 comprises monitoring to detect occurrence of the stimulus 214. This may comprise monitoring a clock or timer in some cases. Alternatively, the action 222 may comprise monitoring one or more environmental sensors to detect physical events and/or environmental conditions within or without the user premises. Environmental conditions may include activity detected by motion detectors, door and window sensors, or other home security devices. Environmental conditions may also include things such as temperature, operational status of devices and equipment, on/off states of lights, etc.

The action 222 may also comprise monitoring communications with or notifications from other devices. For example, other devices may send signals or communications to the audio device 102 using local means such as local networks, wireless communications media, or other means of data communications. If the stimulus 214 is not detected, the action 222 is repeated in order to monitor for future occurrences of the stimulus 214.

In response to detecting occurrence of the stimulus 214, an action 224 is performed of determining if there is access by the audio device 102 through a communications network. More specifically, the action 224 may comprise determining whether network connectivity exists to any outside or remote sources upon which performance of the full action 216 may depend. If such network connectivity is available to the audio device 102, an action 226 is performed of implementing or performing the full action 216. Otherwise, if the network connectivity is not available to the audio device 102, an action 228 is performed of implementing or performing the reduced action 218.

As discussed above, the stimulus 214 may comprise any of various conditions and/or events, including combinations of conditions and/or events. In some embodiments, the stimulus 214 may comprise a notification time or time of day, corresponding to a time at which the audio device 102 is to notify the user by playing audio content such as music, a message, an alarm, or performing some other action. Alternatively, the stimulus 214 may comprise a message or notification, an environmental condition, an event, a threshold, a user action, etc.

The full action 216 may comprise any of various actions and/or functions, including combinations of actions and/or functions. For example, the full action 216 may comprise playing online audio content such as music, spoken word, weather forecasts, stock market reports, news reports, other reports, communications, error messages, etc. The full action 216 may similarly comprise presenting content that is generated dynamically by a remote service or provider at the time of the stimulus 214 and that changes and updates over time. The content may comprise speech and/or other audible content as well as other content such as visual content that is displayed or projected for viewing by the user.

The full action 216 may also comprise requesting or performing other services on behalf of the user, such as ordering items or services from online vendors, obtaining dynamically generated information from online sources, performing home automation actions, controlling devices within a home, initiating communications with persons or entities, connecting to devices and remote services, monitoring processes, providing data, and so forth.

The reduced action 218 may also comprise various actions, functions, and combinations of actions and functions that do not rely on wide-area network communications. The reduced action 218 may comprise playing locally available and/or predefined audio content, including music, spoken word, cached reports, predefined or generic error messages, etc. The reduced action 218 may also comprise monitoring local sensors, caching monitored data, controlling local devices including home automation devices, providing notifications, communicating with users, etc.

As one example, the stimulus may comprise a notification time, the full action 216 may indicate an online, network-accessible music repository or other network source from which to obtain preferred audio content, and the reduced action may indicate or specify a tone or other simple audio segment that is available to the audio device 102 even when network communications with remote sources are not available. At the notification time, the audio device 102 attempts to obtain the audio from the network-accessible music source. If the audio specified as the full action 216 is available and can be obtained from the network source over an available communications network, the audio device 102 obtains and plays the audio on the speaker 112 of the audio device 102. Otherwise, the audio specified by the reduced action 218 is played on the speaker 112. The preferred audio content may comprise music, informational content that changes over time, etc.

As another example, the stimulus 214 may comprise a notification or event time and the full action 216 may indicate a source of dynamically updated informational content such as a weather report, a stock report, a news report, etc., that changes over time. The reduced action 218 may specify that the audio device 102 is to present a previously cached report to the user in the event that the source of the report cannot be reached at the specified notification time. In response to receiving the command 212, prior to the notification or event time, the audio device 102 may obtain and cache the report. At the event time, the audio device 102 may update the report from the source indicated in the command 212 and present the report to the user. However, if the audio device 102 is not able to communicate with the source of the report, a previously cached version of the report may be presented to the user. For example, a previously cached weather forecast may be presented to the user.

As yet another example, the stimulus 214 may comprise the occurrence of a system error that is to be communicated to the user 106 by the control service 108. The full action 216 may comprise communicating with the control service 108 to obtain and then play a situation-specific error message that is generated dynamically by a network-accessible service in specific response to a reported error. Such an error message may be relatively verbose and may contain details regarding the actual error. The reduced action 218 may comprise playing a locally stored generic error message, where the generic error message is predefined to cover numerous types of errors and is not specific or verbose with regard to the actual occurring error. In some cases, the reduce action may comprise playing a locally stored tone or audio cue that indicates an error.

As still another example, a full action 216 may comprise notifying a user using a first communication media such as email, which may be accomplished by communicating over a wide-area network with an email service or provider. The reduced or fallback action 218 may comprise notifying the user by providing a local alert or audio message. In some cases, the reduced or fallback action 218 may comprise messaging the user using a second, alternative communications medium such by providing a text message to a telephone of a user using a cellular telephone network.

In some cases, the action 224 may comprise determining current communications capabilities of an available network communications media and determining whether preferred communication speeds or options are available. Some types of communication networks may provide different levels of service at different times, depending on conditions such as network loading, user location, and other factors. For example, a mobile communication device may at times have access to relatively fast network communications, while at other times may have access only to relatively slower network communications. The action 224 may comprise determining whether preferred network communications capabilities or speeds are available, and performing the full action 216 only when such preferred or faster network communications capabilities or speeds are available. When preferred communications capabilities or speeds are not available, the reduced action 218 may be performed, possibly utilizing the relatively lower speed communications that remain available.

Figure 3:
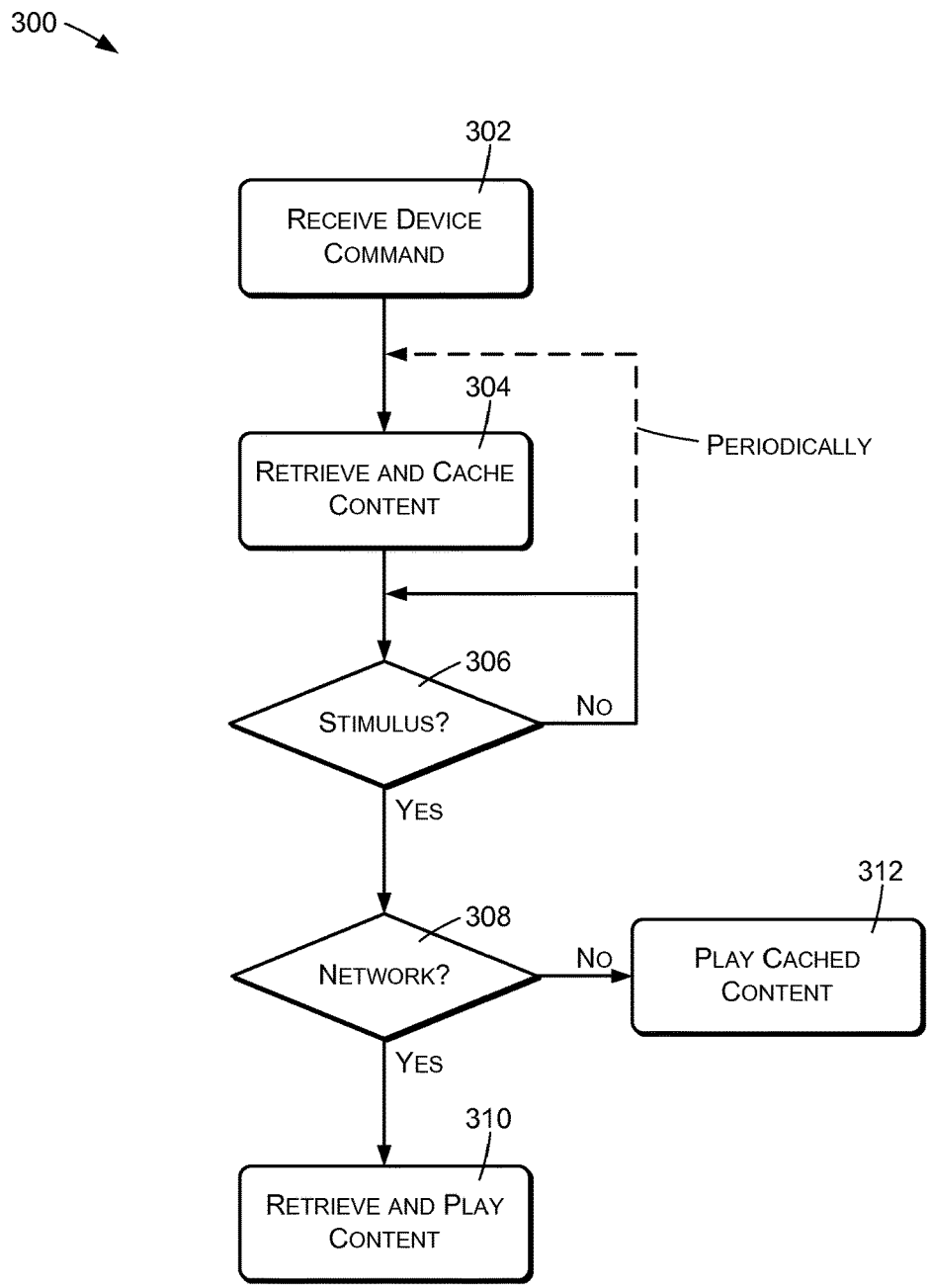
FIG. 3 is a flow diagram illustrating caching of content that may be performed by the local audio device.

FIG. 3 illustrates an example method 300 of caching of content during periods when network communications are available and using such cached content in the case that network communications are no longer available at the time the content is to be played. An action 302 comprises receiving a device command, which may specify a stimulus and content that is to be rendered upon detecting the stimulus. An action 304 comprises retrieving and caching the specified content locally, so that it can be used if needed upon detection of the stimulus. For example, the content may comprise a song or an initial portion of an audio stream, which may be stored using local storage available to the audio device.

An action 306 comprises monitoring to detect the specified stimulus. If the stimulus is not detected, the action 306 is repeated in order to monitor for future occurrences of the stimulus.

In some cases, the action 304 of retrieving and caching the content may be repeated at suitable intervals, as indicated by the dashed line of FIG. 3, to periodically update the cached content. This may be appropriate, for example, when the content is of a type that changes over time, such as might be the case with a weather forecast or news report.

If the stimulus is detected in the action 306, an action 308 is performed of determining whether network connectivity exists to the outside or remote source from which the content is available. If such connectivity exists, an action 310 is performed of retrieving and caching the specified content. If network connectivity does not exist, an action 312 is performed of playing the previously and most recently cached content.

The embodiments described above may be implemented programmatically, such as with computers, processors, digital signal processors, analog processors, and so forth. In other embodiments, however, one or more of the components, functions, or elements may be implemented using specialized or dedicated circuits, including analog circuits and/or digital logic circuits. The term "component", as used herein, is intended to include any hardware, software, logic, or combinations of the foregoing that are used to implement the functionality attributed to the component.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A device, comprising:
a network communications interface configured to connect to one or more network-based computing devices through a communications network;
a microphone to generate an audio signal based at least in part on audio, the audio signal representing speech;
a speaker;
a memory storing first audio data; and
control logic configured to perform acts comprising:
sending the audio signal to the one or more network-based computing devices for recognition of the speech;
receiving a command from the one or more network-based computing devices, the command indicating a notification time derived from the audio signal using speech recognition, wherein the notification time is a time for obtaining, via the communications network, second audio data from a network source; and
at the notification time:
determining that the communications network is unavailable; and
causing, based at least in part on determining that the communications network is unavailable, output of audio content represented by the first audio data using the speaker.

2. The device of claim 1, wherein the command further indicates the first audio data.

3. The device of claim 1, wherein the command contains the first audio data.

4. The device of claim 1, wherein the second audio data comprises music or spoken word.

5. The device of claim 1, wherein the network source comprises a network-accessible music repository.

6. A device, comprising:
one or more processors; and
one or more non-transitory computer-readable media storing computer-executable instructions that, when executed by the one or more processors, cause the one or more processors to perform acts comprising:
transmitting, to one or more network-based computing devices, an audio signal;
receiving one or more commands from the one or more network-based computing devices, wherein the one or more commands specify a stimulus for obtaining, via a network communication, first audio data from a source, and wherein the one or more commands are derived from the audio signal using speech recognition;
storing second audio data;
determining that the stimulus has occurred; and
in response to determining that the stimulus has occurred:
determining that the first audio data is at least temporarily unobtainable from the source; and
causing output of audio content represented by the second audio data based at least in part on the first audio data being at least temporarily unobtainable from the source.

7. The device of claim 6, the acts further comprising:
receiving an indication that a current time of day corresponds to a predefined time of day, wherein determining that the stimulus has occurred is based at least in part on receiving the indication.

8. The device of claim 6, the acts further comprising:
receiving an indication that a predefined amount of time has elapsed,
wherein determining that the stimulus has occurred is based at least in part on receiving the indication.

9. The device of claim 6, the acts further comprising:
receiving an indication that a predefined environmental condition has occurred,
wherein determining that the stimulus has occurred is based at least in part on receiving the indication.

10. The device of claim 6, wherein the first audio data comprises a first error message and the second audio data comprises a second error message, and wherein the first error message contains more information than the second error message.

11. The device of claim 6, wherein the first audio data comprises an error message that is generated dynamically by the one or more network-based computing devices and the second audio data comprises a predefined error message.

12. The device of claim 6, the acts further comprising receiving, prior to determining that the stimulus has occurred, the second audio data from the one or more network-based computing devices.

13. The device of claim 6, wherein the one or more commands further specify that the device is to output the audio content represented by the second audio data based at least in part on the first audio data being unobtainable.

14. A method, comprising:
receiving, at a local device and from one or more remote network-based computing devices associated with a remote control service providing services to a plurality of devices, an identification of a stimulus, and an indication of a primary action that is to be initiated at the device in response to the stimulus occurring, wherein the primary action relies on access to the remote control service through a communications network;
receiving, at the local device and from the one or more remote network-based computing devices, an indication of a contingent action that is to be initiated at the device in response to the stimulus occurring, wherein the contingent action may be performed without access to the remote control service;
storing, by the local device, audio content;
determining, by the local device, that the stimulus has occurred; and
in response to determining that the stimulus has occurred:
determining, by the local device, that the remote control service is inaccessible; and
based at least in part on determining that the remote control service is inaccessible, performing, by the local device, the contingent action, wherein the contingent action includes at least outputting the audio content.

15. The method of claim 14, wherein the primary action comprises controlling one or more devices within a home.

16. The method of claim 14, wherein:
the primary action comprises obtaining and presenting a weather forecast; and
the audio content corresponds to a previously cached weather forecast.

17. The method of claim 14, wherein the primary action comprises notifying, by the local device, a user using a first communications medium.

18. The method of claim 14, wherein:
the primary action comprises receiving and outputting an error message that is generated dynamically by a network-accessible source; and
the audio content comprises a predefined error message.

19. The method of claim 14, wherein the primary action comprises obtaining additional audio content using the communications network and outputting the additional audio content.

20. The method of claim 14, further comprising:
receiving, from the one or more remote network-based computing devices, an indication of a predefined time of day,
wherein determining that the stimulus has occurred is based at least in part on receiving the indication of the predefined time of day.

* * * * *